(12) United States Patent
Bonta

(10) Patent No.: US 7,515,568 B2
(45) Date of Patent: Apr. 7, 2009

(54) NEIGHBORHOOD WIRELESS PROTOCOL WITH SWITCHABLE AD HOC AND WIDE AREA NETWORK COVERAGE

(75) Inventor: Jeffrey D. Bonta, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 1578 days.

(21) Appl. No.: 10/014,676

(22) Filed: Dec. 11, 2001

(65) Prior Publication Data

US 2003/0108016 A1 Jun. 12, 2003

(51) Int. Cl.
*H04Q 7/24* (2006.01)

(52) U.S. Cl. .................. 370/338; 370/238; 370/332; 370/342; 455/435.1; 455/436; 455/438; 455/437

(58) Field of Classification Search .................. 370/338, 370/352, 401, 254, 331, 320, 321, 238, 332, 370/342; 455/517, 465, 462, 463, 74, 74.1, 455/435, 436, 442, 443, 444, 438
See application file for complete search history.

(56) References Cited

U.S. PATENT DOCUMENTS

| | | | | |
|---|---|---|---|---|
| 6,108,322 A * | 8/2000 | Kotzin et al. | ................. | 370/333 |
| 6,130,881 A | 10/2000 | Stiller | ........................ | 370/238 |
| 6,304,556 B1 | 10/2001 | Haas | ......................... | 370/254 |
| 6,377,805 B1 * | 4/2002 | Anvekar et al. | ............. | 455/436 |
| 6,393,261 B1 * | 5/2002 | Lewis | ......................... | 455/103 |
| 6,456,599 B1 * | 9/2002 | Elliott | ........................ | 370/254 |
| 6,842,460 B1 * | 1/2005 | Olkkonen et al. | ........... | 370/465 |
| 6,879,574 B2 * | 4/2005 | Naghian et al. | ............. | 370/338 |
| 6,882,677 B2 * | 4/2005 | Dehner et al. | ................ | 375/132 |
| 7,009,952 B1 * | 3/2006 | Razavilar et al. | ............ | 370/331 |
| 7,114,010 B2 * | 9/2006 | Karaoguz et al. | ........... | 709/250 |
| 7,171,206 B2 * | 1/2007 | Wu | ............................ | 455/438 |
| 2001/0036810 A1 * | 11/2001 | Larsen | ...................... | 455/11.1 |
| 2002/0028690 A1 * | 3/2002 | McKenna et al. | ........... | 455/517 |
| 2002/0173303 A1 * | 11/2002 | Shibutani | ..................... | 455/426 |
| 2003/0016655 A1 * | 1/2003 | Gwon | ......................... | 370/352 |
| 2003/0054818 A1 * | 3/2003 | Bahl et al. | ................... | 455/432 |
| 2004/0223469 A1 * | 11/2004 | Bahl et al. | ................... | 370/331 |

* cited by examiner

*Primary Examiner*—Edan Orgad
*Assistant Examiner*—Chuong Ho

(57) ABSTRACT

A method of communicating in and around a localized wireless coverage area according to the present invention provides cellular coverage to a neighborhood cell (18) in which service might otherwise not be possible or in which a high percentage of calls would otherwise end up being dropped. Specifically, a neighborhood cell (18) is defined by either one or more fixed last hop nodes (20) or mobile last hop nodes (120). If a source mobile subscriber unit (12) communicates with a destination unit through wide area wireless network coverage, the source mobile subscriber unit (12) is handed over to ad hoc wireless network coverage either automatically or upon the occurrence of a high frame error rate when it enters the neighborhood cell (18) to maintain communication with the destination unit. If the source mobile subscriber unit (12) is already communicating through ad hoc wireless coverage within the neighborhood cell (18), it is handed over to wide area wireless network coverage when it exits the neighborhood cell (18) to maintain communication with the destination unit.

11 Claims, 4 Drawing Sheets

NEIGHBORHOOD WIRELESS PROTOCOL WITH SWITCHABLE AD HOC AND WIDE AREA NETWORK COVERAGE

BACKGROUND OF THE INVENTION

1. Field of the Invention

The present invention relates generally to wireless communications systems, and specifically to a system that is capable of switching subscriber units from cellular wide area network coverage to ad hoc network coverage.

2. Description of Related Art

In conventional wide area network cellular systems, localized, or neighborhood, coverage, including in-building coverage, often cannot be guaranteed, as it would be cost prohibitive and impractical to install base stations for all indoor and outdoor locations within a service area. Consequently, system planners often only guarantee 90-95% coverage within a service area.

In addition, guaranteed neighborhood wireless coverage is impractical because the call model for such coverage is much different than that for traditional cellular coverage. Specifically, calls within such a localized area are typically much longer in duration and are often more frequent among a higher percentage of subscribers. The resulting load associated with providing such coverage would consequently require the installation of a large number of small footprint cells in a conventional cellular system to ensure coverage to a given neighborhood or building complex. Such coverage might be cost prohibitive, as users of the localized service would probably expect usage costs that were equivalent to landline system usage costs.

In order to provide such localized service at usage costs equivalent to landline usage costs, neighborhood service would have to be tiered so that service within the neighborhood would have one associated cost, while transition to service outside the neighborhood would have a different associated cost. However, traditional cellular systems cannot effectively control such transitions. For example, in CDMA type systems, deployment of microcells or picocells effectively punches holes in the wide area coverage so that any user who comes within range of such cells must be serviced by the cells to avoid co-channel interference from these cells. Unfortunately, as a result, the capacity of a cell reserved for servicing the neighborhood would be reduced.

If the deployment of a microcell or picocell utilized a carrier frequency that was different from the adjacent wide area network coverage, then it would be possible to prevent non-subscribers from utilizing the neighborhood resources by denying handoffs to non-subscriber handoff candidates. However, such a solution would still be costly to implement due to the backhaul required for each neighborhood microcell and/or picocell. In addition, the equipment required to implement each neighborhood cell, and the deployment and maintenance of such equipment, would be costly. Also, adjacent neighborhoods would still have to share resources to, for example, facilitate soft handoffs whenever a subscriber was in a boundary region to avoid co-channel interference from carrier frequencies shared by neighboring cells.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
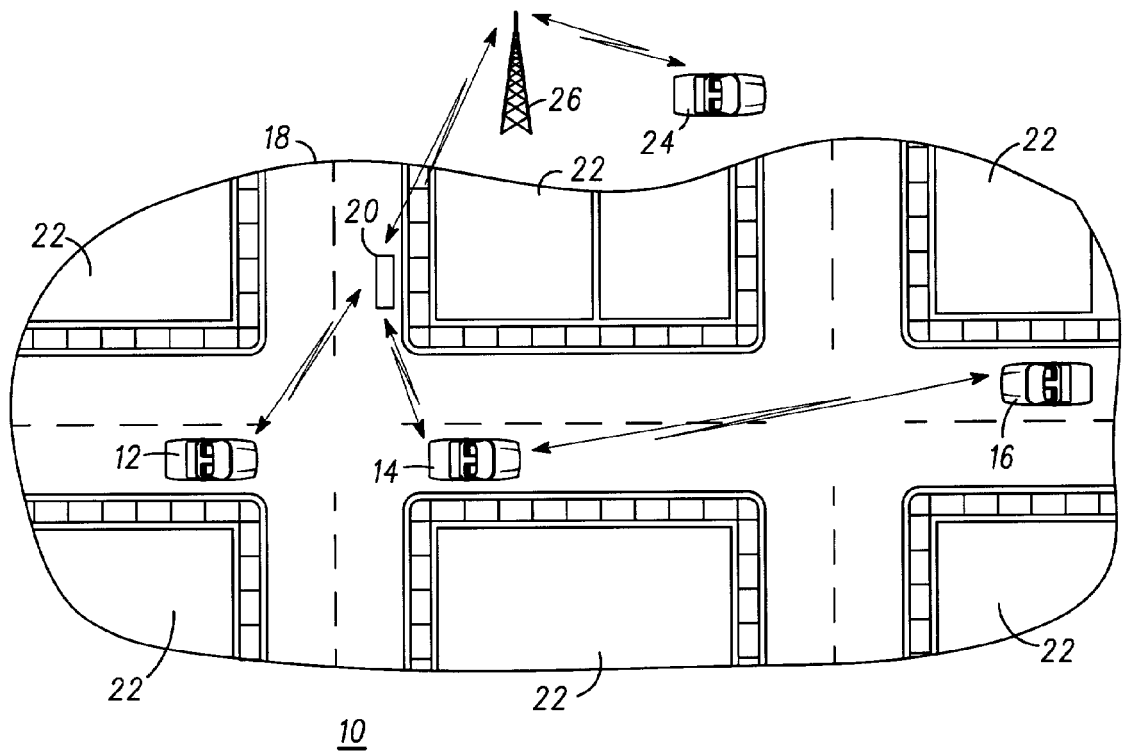
FIG. 1 is a system diagram of an exemplary neighborhood wireless network in which the localized wireless communications protocol according to a preferred embodiment of the present invention is implemented.

Referring now to the drawings in which like numerals reference like parts, FIG. 1 shows an exemplary neighborhood wireless network 10 in which the localized wireless communications protocol according to a preferred embodiment of the present invention is implemented. The neighborhood wireless network 10 includes several mobile subscriber units, such as the mobile subscriber units 12-16, that subscribe to a service that provides localized coverage within a neighborhood cell 18. A relay, or last hop, node 20 is preferably a mobile unit that is fixed at a predetermined neighborhood location and that transmits a signal that defines the neighborhood cell 18. The neighborhood cell 18, which is, for example, a microcell or a picocell, enables wireless service to be provided to, for example, an area including several buildings 22 that would have a high occurrence of dropped calls if wireless service was otherwise provided by a wide area network service provider.

The mobile subscriber units 12-16 can communicate with each other within the neighborhood cell 18. These units can also communicate with other destination units, including other mobile units represented generally by the mobile unit 24, and service provider base stations, represented by the base station 26, outside of the neighborhood cell 18 through an ad hoc communication path created within the neighborhood cell 18. More specifically, the mobile subscriber units 12-16 are capable of switching between wide area network coverage, such as the ETSI standard for UMTS wideband CDMA (hereinafter referred to as UMTS), as documented in $3^{rd}$ Generation Partnership Project (3GPP) working party papers, in which all communication is directed through the base station 26 and onto a wide area network, and localized ad hoc network coverage, such as Opportunity Driven Multiple Access (ODMA) coverage (also defined by 3GPP) that operates in a different spectrum than, for example, the spectrum utilized for UMTS coverage, depending upon the respective locations of the mobile units to minimize the occurrence of dropped calls within the neighborhood cell 18.

Figure 2:
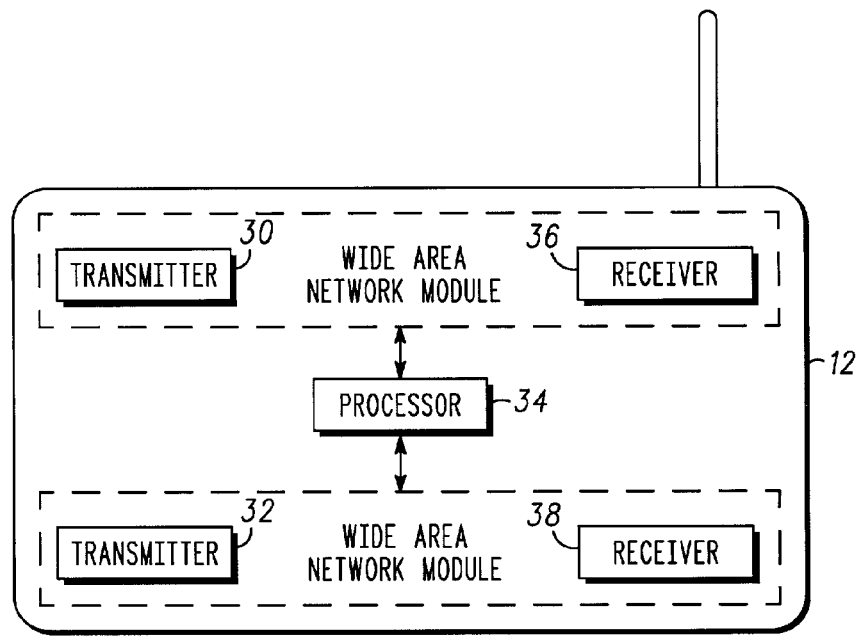
FIG. 2 is a system block diagram illustrating the hardware components of an exemplary mobile subscriber unit shown in FIG. 1.

Specifically, each of the mobile subscriber units 12-16 has dual network communication capabilities that enable the units to switchably communicate via either the wide area or the ad hoc network coverage to prevent calls from being dropped. FIG. 2 shows the hardware components of, for example, the mobile subscriber unit 12, although the hardware configurations of the other mobile subscriber units 14, 16 are identical. Specifically, the mobile subscriber unit 12 includes both wide area and ad hoc network transmitters 30, 32 for respectively transmitting wide area and ad hoc network traffic, referred to hereinafter as data packets, to destination units within or outside of the neighborhood cell based on instructions from a unit processor 34. In addition, the mobile subscriber unit 12 also includes both wide area and ad hoc network receivers 36, 38 for respectively receiving wide area and ad hoc network data packets from other mobile units, the last hop node 20 and the base station 26. Preferably, the processor 34 is programmed so that the mobile subscriber unit 12, while within the neighborhood cell 18, communicates with the other mobile subscriber units 14-20 using time division duplex (TDD) protocol. In addition, the processor 34 is programmed so that the last hop node 20 uses frequency division duplex (FDD) protocol when communicating with the base station 26. However, it is contemplated that the mobile subscriber unit 12 could also communicate with the other mobile subscriber units 14, 16 using FDD protocol if its transmit and receive frequencies were sufficiently spaced.

Figure 3:
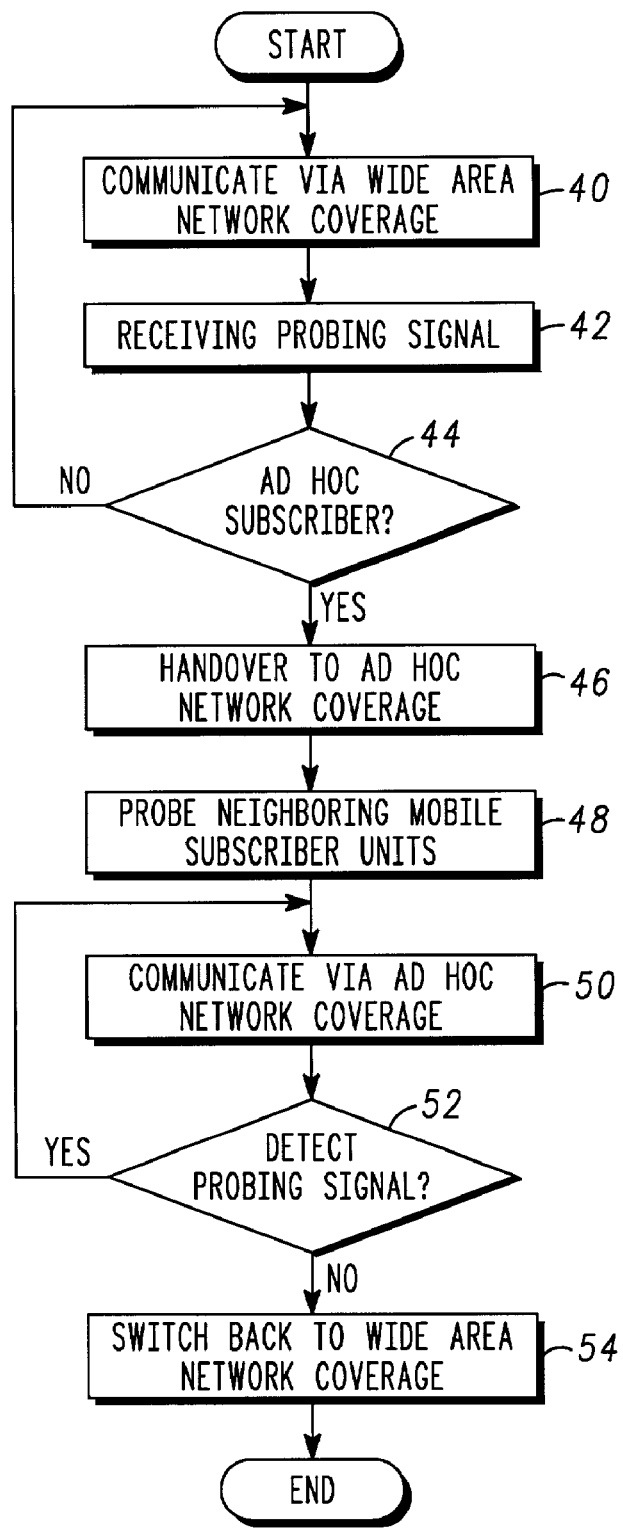
FIG. 3 is a flow diagram of the localized wireless communications protocol according to a preferred embodiment of the present invention.

Referring to FIG. 3, operation of the localized wireless communications protocol according to a preferred embodiment of the present invention will now be discussed. Although the operation of the mobile subscriber unit 12 will be specifically discussed, it should be noted that the operation of the mobile subscriber units 14, 16 is essentially identical to that of the mobile subscriber unit 12. Preferably, the last hop node 20 defines the neighborhood cell 18 by periodically transmitting a neighborhood-defining signal such as, for example, an ODMA based probing signal. At 40, the mobile subscriber unit 12 initially communicates via wide area network coverage while outside of the neighborhood cell 18. The mobile subscriber unit 12 then enters the neighborhood cell 18. At 42 it receives the probing signal from the last hop node 20 and at 44 determines whether it is a subscriber to the neighborhood ad hoc network coverage. If it is a subscriber, then at 46 the mobile subscriber unit 12 internally causes a handover to be performed from wide area network coverage to ad hoc network coverage. However, it should be noted that, if the mobile subscriber unit 12 was engaged in a call, the base station 26 would become involved in the handover since data packets would then be relayed through the last hop node 20. If the mobile subscriber unit 12 is not a subscriber, then it continues communicating under wide area network coverage within the neighborhood cell 18.

If the mobile unit is a subscriber and is handed over to the ad hoc network coverage at 46, at 48 it then probes neighboring mobile subscriber units within the neighborhood cell 18 and also communicates via ad hoc network coverage to collect destination unit routing and cost information from not only the neighboring units but also from units that neighbor the neighboring units. At 50, the mobile subscriber unit 12 then uses this collected information to communicate with a destination unit via ad hoc network coverage, and more specifically over an ad hoc route defined as a series of short hops between neighboring mobile subscriber units and based on the collected routing and cost information. Such a probing ad hoc protocol may be implemented according to, for example, the above discussed ODMA methodology, which provides low power and opportunistic transmission times in addition to ad hoc networking capabilities.

As a result, otherwise difficult communication paths within the neighborhood cell 18 can be broken up into a series of short hops provided that a sufficient number of mobile subscriber units are in place to perform the relay. In addition, the risk of a high frame error rate and of calls being dropped is reduced when the mobile subscriber unit 12 enters the neighborhood cell 18. Specifically as shown in FIG. 1, each of the mobile subscriber units 12, 14 is capable of communicating with the last hop node 20 via an ad hoc route established directly between the respective units and the last hop node 20, while the mobile subscriber unit 16 is capable of establishing an ad hoc route to the last hop node 20 through the mobile subscriber unit 14.

At this point it should be noted that the last hop node 20, when operating under the localized wireless communications protocol according to a preferred embodiment of the present invention, eliminates the need for the base station 26 to support both wide area and ad hoc network communication and therefore enables the transmit power required for the wide area network to be minimized. This is because the last hop node 20 is capable of communicating simultaneously in an ad hoc network coverage mode with the mobile subscriber units 12-16 within the neighborhood cell 18 and in a wide area network coverage mode with the base station 26 to multiplex data packets transmitted from the mobile subscriber units 12-16 via the ad hoc network and to transmit the multiplexed data packets on a single wide area coverage channel to the base station via the wide area network.

Still referring to FIG. 3, if at 52 the mobile subscriber unit 12 no longer detects the probing signal from the last hop node 20, it determines that it has left the coverage area defined by the neighborhood cell 18. At 54, the mobile subscriber unit 12 subsequently causes a handover to be performed back to wide area network coverage from ad hoc network coverage However, it should be noted that, if the mobile subscriber unit 12 was engaged in a call, the base station 26 would be involved in the handover since data packets related to the mobile subscriber unit 12 would no longer be relayed through the last hop node 20. As a result, neighborhood network resources are freed up.

It should be appreciated at this point that the interoperability between wide area and ad hoc network coverage provided by the localized wireless communications protocol according to the above-described preferred embodiment of the present invention provides many advantages over conventional solutions to localized coverage needs. For example, the probing feature of an ad hoc node automatically triggers handover of a mobile subscriber unit entering or leaving a neighborhood cell to ad hoc or wide area network coverage, respectively, and therefore provides a built-in mechanism for determining mobile subscriber units eligible for use in establishing an ad hoc route between a source mobile subscriber unit sending data packets and an intended destination unit. In addition, as each ad hoc node is nothing more than a stationary mobile unit and therefore has very low power requirements when compared to a conventional base station, neighborhood cells can be implemented with minimal cost and can be kept to a manageable size. Also, because ad hoc network coverage is implemented using ad hoc routing methodology such as ODMA to transmit and receive data packets, there are no associated backhaul costs associated with implementing the ad hoc node or nodes serving and defining each neighborhood cell, and connection resources and costs are minimal.

Further, sharing of neighborhood resources is not a problem because the only real resource necessary to implement the protocol of the present invention is the capacity to relay traffic or control data transmission between neighborhoods. The ad hoc node could easily regulate such traffic relay or data control during its route determination processing. Also, the ad hoc network coverage would permit mobile to mobile calls within a neighborhood with little more than supervision responsibilities from the wide area network base station, as no handoffs are required within the neighborhood. This lack of infrastructure intervention also would permit calls between mobile subscriber units within the neighborhood cell when each unit has the same subscriber number or group id. For example, two cellular telephones within the same household could contact each other and communicate essentially in an intercom mode. In another example, two subscriber telephones in an office complex having many subscriber telephones with the same group id could contact each other, or one of the telephones could communicate with several of the other telephones having the same group id using a dispatch mode of operation. None of these embodiments would require infrastructure intervention unless, for example, it was necessary to indicate that a particular destination telephone was busy.

It should also be appreciated that the localized wireless communications protocol according to a preferred embodiment of the present invention may be utilized to provide a Bluetooth interface to a home mounted ad hoc node to support home data interconnections at the speed offered by Bluetooth bandwidth. For example, if a home based personal computer has a Bluetooth interface, data could be communicated at high speed from the personal computer to an ad hoc node that also has a Bluetooth interface. The ad hoc node could then relay the data to a wide area network base station.

Figure 4:
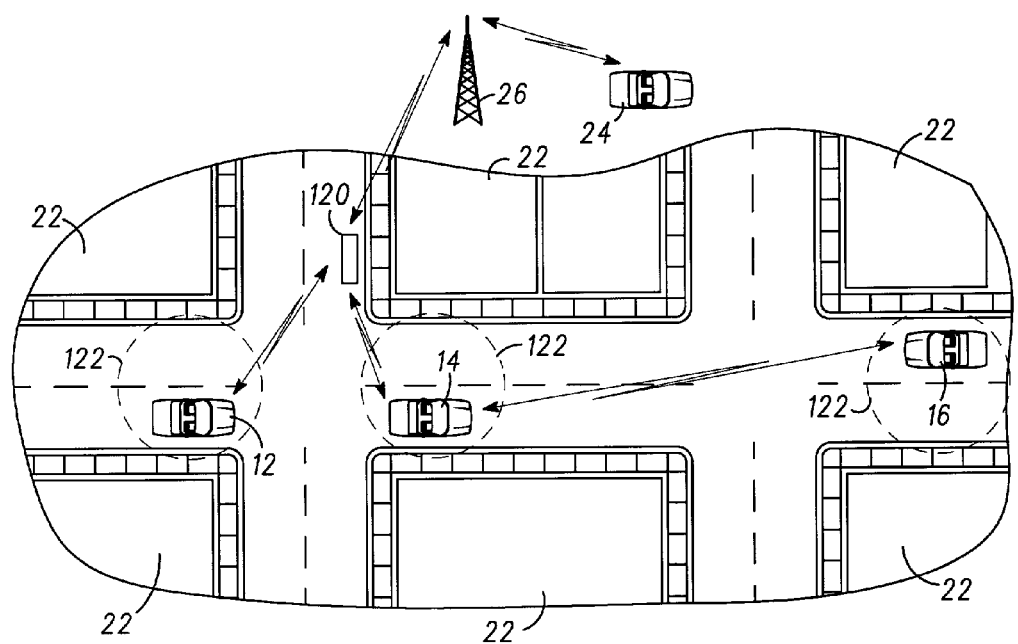
FIG. 4 is a system diagram of an exemplary neighborhood wireless network in which the localized wireless communications protocol according to another preferred embodiment of the present invention is implemented.

FIG. 4 shows an exemplary neighborhood wireless network 100 in which the localized wireless communications protocol according to another preferred embodiment of the present invention is implemented. As in the neighborhood wireless network 10, each of the mobile subscriber units 12-16 in the neighborhood wireless network 100 periodically probes neighboring mobile subscriber units to collect information about these units and about mobile subscriber units that neighbor the neighboring units based on the above-discussed ODMA methodology. Consequently, each of the mobile subscriber units 12-16 is capable of determining both an ad hoc route to a destination unit through ad hoc connections between neighboring mobile subscriber units, as well as a cost associated with using the determined route, including a least cost data packet route. As a result, otherwise difficult communication paths within the neighborhood cell can be broken up into a series of short hops provided that a sufficient number of mobile subscriber units are in place to perform the relay.

However, the wireless neighborhood network 100 does not include a stationary switch such as the last hop node 20 in FIG. 1. Rather, a subset of mobile subscriber units such as the mobile subscriber unit 120 may be designated, either beforehand through programming techniques or through on-the-fly self-designation techniques, as a mobile last hop ad hoc communications relay to operate simultaneously in both wide area and ad hoc modes of operation and to act as a server, and therefore dynamically define the neighborhood cell 118, for the other mobile subscriber units 12-16 requiring ad hoc network coverage when, for example, the mobile subscriber units travel into coverage holes 122, if the neighborhood coverage area does not require a permanent type of relay. A last hop ad hoc communications relay such as the mobile subscriber unit 120 multiplexes one or more data packet transmissions with its own data packet transmission onto a single wide area coverage channel for transmission to the base station 26. As with the stationary last hop node 20, the last hop mobile subscriber unit 120 eliminates the need for the base station 26 to support both wide area and ad hoc modes of operation and therefore enables the transmit power required for the wide area network to be minimized.

Figure 5:
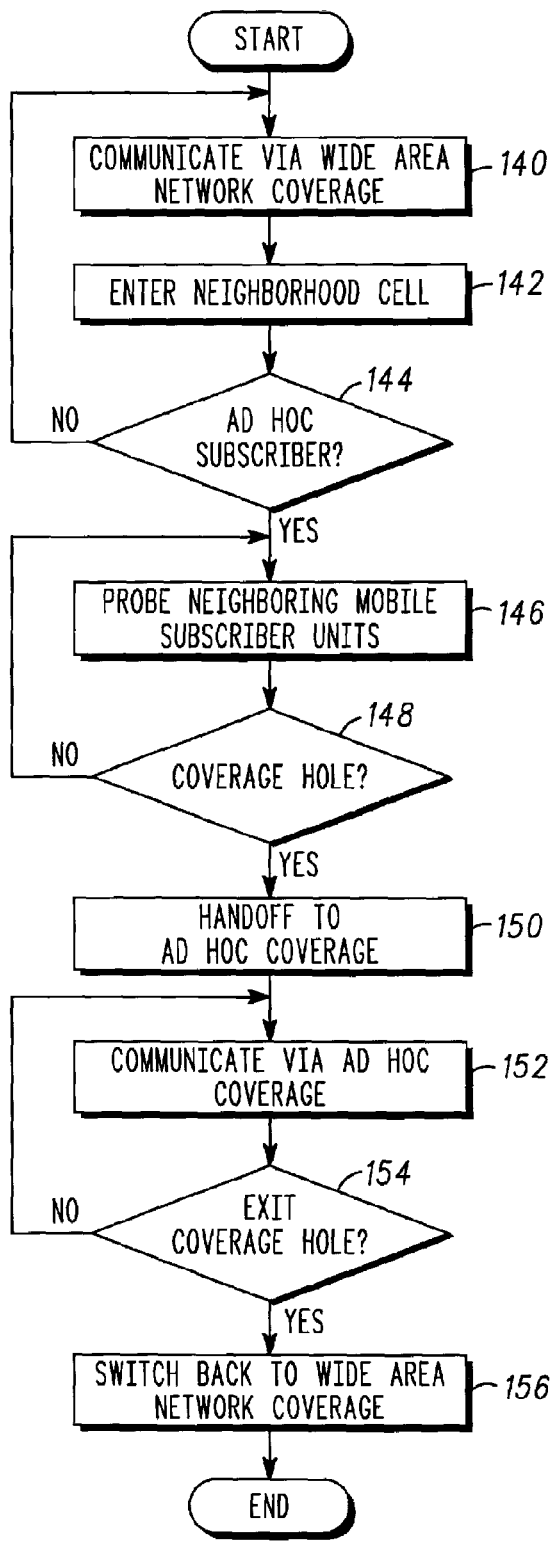
FIG. 5 is a flow diagram of the localized wireless communications protocol according to another preferred embodiment of the present invention.

FIG. 5 illustrates the localized wireless communications protocol according to another preferred embodiment of the present invention, with reference again being made to the operation of mobile subscriber unit 12 for purposes of discussion only. At 140, the mobile subscriber unit communicates via wide area network coverage, and continues to do so even when at 142 it enters the neighborhood cell 18. At 144, the mobile subscriber unit 12 determines if it is a subscriber to ad hoc network coverage upon receiving probing signals from neighboring mobile subscriber units and not necessarily from a last hop node as in the previously discussed embodiment. If it is not a subscriber, it continues to communicate via wide area network coverage at 140. If, however, it is a subscriber to ad hoc network coverage, at 146 it begins to probe neighboring mobile subscriber units to collect ad hoc networking information as discussed above. At 148, the mobile subscriber unit 12 determines if communication between it and a destination unit (not shown) has been interrupted because, for example, the mobile subscriber unit 12 has entered one of the coverage holes 122 within the neighborhood cell 18 or if it has entered a neighborhood cell interference region.

At 150, upon detecting the above interruption in communication, the mobile subscriber unit 12 performs a handover of the communication to ad hoc network coverage. At 152, the mobile subscriber unit 12 then communicates with the destination unit via ad hoc network coverage until, for example, at 154 the mobile subscriber unit determines that it has exited the coverage hole 122. Subsequently, at 156, the mobile subscriber unit 12 switches back to communicating via wide area network coverage.

It should be appreciated that the present invention is applicable not only between UMTS and ad hoc mobile communication systems, but also to any other type of network that requires interoperability between two different types of signaling systems. For example, cellular systems defined in standards such as IS-95, IS-2000 and GSM could be designed to interoperate between any communication system that supports ad hoc networking defined in standards such as IEEE 802.11 or Bluetooth. while the above description is of the preferred embodiment of the present invention, it should be appreciated that the invention may be modified, altered, or varied without deviating from the scope and fair meaning of the following claims.

What is claimed is:

1. A method of communicating in and around a localized wireless coverage area, comprising:

defining a neighborhood cell by transmitting a localized wireless coverage area-identifying signal from a neighborhood cell transmitter;

establishing communication between a source mobile subscriber unit and a destination unit;

if the establishing, of communication between a source mobile subscriber unit and a destination unit is achieved through wide area network coverage when the source mobile subscriber unit is outside of the neighborhood cell, receiving the localized wireless coverage area identifying signal and determining whether the source mobile subscriber unit is a subscriber on the neighborhood cell and if the source mobile subscriber unit is a subscriber, switching over to ad hoc wireless network coverage when, the source mobile subscriber unit enters the neighborhood cell to maintain the communication between the source mobile subscriber unit and the destination unit; and if the establishing of communication between a source mobile subscriber unit and a destination unit is achieved through the ad hoc wireless network coverage when the source mobile subscriber unit is within the neighborhood cell, switching over to the wide area wireless network coverage when the source mobile subscriber mobile unit exits the neighborhood cell to maintain the communication between the source mobile subscriber unit and the destination unit providing one or more last hop nodes within the neighborhood cell each comprised of a mobile subscriber unit within the neighborhood cell to regulate data packet traffic between the source mobile subscriber unit and the destination unit during the communication between the source mobile subscriber unit and the destination unit; and at all subscriber units within the neighborhood cell, including the source mobile subscriber unit and the one or more last hop nodes, periodically probing a first set of mobile subscriber units in proximity thereto to collect ad hoc wireless network coverage information.

2. The method of claim 1, wherein, if the establishing of communication between a source mobile subscriber unit and a destination unit is achieved through wide area network coverage when the source mobile subscriber unit is outside of the neighborhood cell, switching over to the ad hoc wireless network coverage when the source mobile subscriber receives a last hop probing signal indicating that the source mobile subscriber unit has entered the neighborhood cell to maintain the communication between the source mobile subscriber unit and the destination unit.

3. The method of claim 1, wherein the periodically probing of a first set of neighboring mobile subscriber units in proximity thereto to collect ad hoc wireless network coverage information comprises:
    periodically probing a first set of neighboring mobile subscriber units to collect ad hoc wireless network coverage route and cost information; and
    utilizing the ad hoc wireless network coverage route and cost information to create a least cost data packet route from the source mobile subscriber unit to the destination unit.

4. A method of communicating in and around a localized wireless coverage area, comprising: defining a neighborhood cell by transmitting a localized wireless coverage area identifying signal from a neighborhood cell transmitter; establishing communication between a source mobile subscriber unit and a destination unit; if the establishing of communication between a source mobile subscriber unit and a destination unit is achieved through wide area network coverage when the source mobile subscriber unit is outside of the neighborhood cell, receiving the localized wireless coverage area identifying signal and determining whether the source mobile subscriber unit is a subscriber on the neighborhood cell and if the source mobile subscriber unit is a subscriber, switching over to ad hoc wireless network coverage when the source mobile subscriber unit enters the neighborhood cell to maintain the communication between the source mobile subscriber unit and the destination unit; if the establishing of communication between a source mobile subscriber unit and a destination unit is achieved through the ad hoc wireless network coverage when the source mobile subscriber unit is within the neighborhood cell, switching over to the wide area wireless network coverage when the source mobile subscriber mobile unit exist the neighborhood cell to maintain the communication between the source mobile subscriber unit and the destination unit; and providing one or more last hop nodes within the neighborhood cell each comprised of a mobile subscriber unit within the neighborhood cell to regulate data packet traffic between the source mobile subscriber unit and the destination unit during the communication between the source mobile subscriber unit and the destination unit, wherein the providing of one or more last hop nodes within the neighborhood cell each comprised of a mobile subscriber unit to regulate data packet traffic between the source mobile subscriber unit and the destination unit during the communication between the source mobile subscriber unit and the destination unit further comprises providing one or more stationary last hop nodes at fixed locations within the neighborhood cell each comprised of a mobile subscriber unit.

5. A method of communicating in and around a localized wireless coverage area, comprising: defining a neighborhood cell by transmitting a localized wireless coverage area identifying signal from a neighborhood cell transmitter; establishing communication between a source mobile subscriber unit and a destination unit; if the establishing of communication between a source mobile subscriber unit and a destination unit is achieved through wide area network coverage when the source mobile subscriber unit is outside of the neighborhood cell, receiving the localized wireless coverage area identifying signal and determining whether the source mobile subscriber unit is a subscriber on the neighborhood cell and if the source mobile subscriber unit is a subscriber, switching over to ad hoc wireless network coverage when the source mobile subscriber unit enters the neighborhood cell to maintain the communication between the source mobile subscriber unit and the destination unit; if the establishing of communication between a source mobile subscriber unit and a destination unit is achieved through the ad hoc wireless network coverage when the source mobile subscriber unit is within the neighborhood cell, switching over to the wide area wireless network coverage when the source mobile subscriber mobile unit exist the neighborhood cell to maintain the communication between the source mobile subscriber unit and the destination unit; and providing one or more last hop nodes within the neighborhood cell each comprised of a mobile subscriber unit within the neighborhood cell to regulate data packet traffic between the source mobile subscriber unit and the destination unit during the communication between the source mobile subscriber unit and the destination unit, wherein the providing of one or more last hop nodes within the neighborhood cell each comprised of a mobile subscriber unit to regulate data packet traffic between the source mobile subscriber unit and the destination unit during the communication between the source mobile subscriber unit and the destination unit further comprises providing one or more mobile last hop nodes each comprised of a mobile subscriber unit that dynamically defines the neighborhood cell.

6. A method of communicating in and around a localized wireless coverage area, comprising: defining a neighborhood cell by transmitting a localized wireless coverage area identifying signal from a neighborhood cell transmitter; establishing communication between a source mobile subscriber unit and a destination unit; if the establishing of communication between a source mobile subscriber unit and a destination unit is achieved through wide area network coverage when the source mobile subscriber unit is outside of the neighborhood cell, receiving the localized wireless coverage area identifying signal and determining whether the source mobile subscriber unit is a subscriber on the neighborhood cell and if the source mobile subscriber unit is a subscriber, switching over to ad hoc wireless network coverage when the source mobile subscriber unit enters the neighborhood cell to maintain the communication between the source mobile subscriber unit and the destination unit; if the establishing of communication between a source mobile subscriber unit and a destination unit is achieved through the ad hoc wireless network coverage when the source mobile subscriber unit is within the neighborhood cell, switching over to the wide area wireless network coverage when the source mobile subscriber mobile unit exist the neighborhood cell to maintain the communication between the source mobile subscriber unit and the destination unit; and providing one or more last hop nodes within the neighborhood cell each comprised of a mobile subscriber unit within the neighborhood cell to regulate data packet traffic between the source mobile subscriber unit and the destination unit during the communication between the source mobile subscriber unit and the destination unit, wherein the providing one or more last hop nodes within the neighborhood cell to regulate data packet traffic between the source mobile subscriber unit and the destination unit during the communication between the source mobile subscriber unit and the destination unit further comprises providing one or more last hop nodes within the neighborhood cell to multiplex mobile subscriber unit data packets onto a single channel for transmission to a wide area network.

7. A method of communicating in and around a localized wireless coverage area, comprising:
   establishing a data packet route to a destination unit through wide area network coverage;
   determining whether a predetermined number of network frame errors have been received subsequent to the establishing of a wide area communication route to a destination unit through a wide area network coverage mode of operation; and
   switching over to ad hoc wireless network coverage to maintain the data packet route to the destination unit upon determining that the data packet route is being disrupted and upon entry into a defined neighborhood cell, the switching over further conditioned on receiving a localized wireless coverage area identifying signal and determining whether service is available and authorized in the defined neighborhood cell periodically probing a plurality of neighboring mobile subscriber units to collect ad hoc wireless network coverage information while within the neighborhood cell, wherein the periodically probing of a plurality of neighboring mobile subscriber units to collect ad hoc wireless network coverage information comprises: periodically probing of a plurality of neighboring mobile subscriber units to collect ad hoc wireless network coverage route and cost information, and wherein the establishing of the data packet route to the destination unit through wide area network coverage within the defined neighborhood cell is executed utilizing the ad hoc wireless network coverage route and cost information.

8. The method of claim 7, further comprising re-establishing the data packet route to the destination unit through the wide area network coverage within the defined neighborhood cell upon leaving a coverage hole within the neighborhood cell.

9. The method of claim 7, further comprising, during the ad hoc wireless network coverage, communicating with one or more stationary last hop nodes within the neighborhood cell to enable data packets transmitted on the data packet route to be multiplexed with other subscriber unit data packets onto a single channel for transmission to a wide area network.

10. The method of claim 7, wherein the switching over to ad hoc wireless network coverage to maintain the data packet route to the destination unit comprises switching over to ad hoc wireless network coverage to maintain the data packet route to the destination unit upon entering into one of a neighborhood cell coverage hole and a neighborhood cell interference region.

11. The method of claim 7, wherein the switching over to ad hoc wireless network coverage to maintain the data packet route to the destination unit when a predetermined number of network frame errors have been detected further comprises communicating, through at least one ad hoc mobile subscriber connection, with a last hop mobile subscriber unit that is connected to a wide area network for transmission of data packets to the wide area network and that dynamically defines the neighborhood cell.

* * * * *